United States Patent
Hwang et al.

(10) Patent No.: US 11,256,725 B1
(45) Date of Patent: Feb. 22, 2022

(54) NORMALIZATION OF CRIME BASED ON FOOT TRAFFIC

(71) Applicant: Trulia, Inc., San Francisco, CA (US)

(72) Inventors: Sha Hwang, San Francisco, CA (US); Talin Salway, San Leandro, CA (US); Eric Wu, San Francisco, CA (US)

(73) Assignee: Zillow, Inc., Seattle, WA (US)

( * ) Notice: Subject to any disclaimer, the term of this patent is extended or adjusted under 35 U.S.C. 154(b) by 908 days.

(21) Appl. No.: 13/797,380

(22) Filed: Mar. 12, 2013

(51) Int. Cl.
*G06F 17/00* (2019.01)
*G06F 16/29* (2019.01)

(52) U.S. Cl.
CPC .................. *G06F 16/29* (2019.01)

(58) Field of Classification Search
CPC .................. G06F 16/29; G06F 16/30
USPC ........................................ 707/758
See application file for complete search history.

(56) References Cited

U.S. PATENT DOCUMENTS

| | | | |
|---|---|---|---|
| 6,223,165 B1 | 4/2001 | Lauffer | |
| 6,522,971 B1* | 2/2003 | Tanaka | G01C 21/3611 340/995.1 |
| 6,983,424 B1 | 1/2006 | Dutta et al. | |
| 8,712,805 B1 | 4/2014 | Ferries et al. | |
| 9,589,433 B1* | 3/2017 | Thramann | G01S 3/7864 |
| 2004/0078215 A1* | 4/2004 | Dahlin | G16H 70/60 705/2 |
| 2004/0142774 A1* | 7/2004 | Kamen | A63B 71/06 473/415 |
| 2006/0184378 A1 | 8/2006 | Agarwal et al. | |
| 2007/0222638 A1* | 9/2007 | Chen | G08G 1/095 340/901 |
| 2007/0229524 A1 | 10/2007 | Hendrey et al. | |
| 2007/0266335 A1 | 11/2007 | Zielinski et al. | |
| 2007/0276619 A1* | 11/2007 | Sugahara | B66C 13/16 702/82 |
| 2008/0162224 A1 | 7/2008 | Coon et al. | |
| 2008/0205419 A1* | 8/2008 | Shin | H04L 12/2834 370/401 |
| 2009/0006185 A1 | 1/2009 | Stinson et al. | |
| 2009/0088967 A1 | 4/2009 | Lerner et al. | |
| 2009/0089149 A1* | 4/2009 | Lerner | G01C 21/32 705/7.34 |
| 2010/0325056 A1 | 12/2010 | Loveland et al. | |
| 2011/0046920 A1* | 2/2011 | Amis | 702/181 |
| 2011/0154293 A1* | 6/2011 | Dharwada | G06F 8/77 717/125 |
| 2011/0202879 A1 | 8/2011 | Stovicek et al. | |
| 2011/0249252 A1* | 10/2011 | Lantz | G01B 11/18 356/32 |

(Continued)

OTHER PUBLICATIONS

Matt Gangemi, The Myth of Downtown Crime Jun. 29, 2012, http://seattletransitblog.com/2012/06/29/the-myth-of-downtown-crime/.*

(Continued)

*Primary Examiner* — Hasanul Mobin
(74) *Attorney, Agent, or Firm* — Perkins Coie LLP

(57) ABSTRACT

A system for displaying crime data comprises an input interface, a processor, and an output interface. The input interface is configured to receive a crime data and receive a foot traffic density data. The processor is configured to determine a normalized crime data based at least in part on the crime data and the foot traffic density data. The output interface configured to provide display information of the normalized crime data.

31 Claims, 14 Drawing Sheets

(56) References Cited

U.S. PATENT DOCUMENTS

| | | | | |
|---|---|---|---|---|
| 2011/0261067 | A1* | 10/2011 | Trinko | G01C 21/3461 |
| | | | | 345/589 |
| 2011/0289077 | A1* | 11/2011 | Wade | G06F 16/248 |
| | | | | 707/723 |
| 2012/0253901 | A1* | 10/2012 | Montgomery | G06Q 30/02 |
| | | | | 705/14.5 |
| 2012/0321210 | A1* | 12/2012 | Forbes | G06T 11/20 |
| | | | | 382/254 |
| 2013/0132874 | A1 | 5/2013 | He et al. | |
| 2014/0279692 | A1 | 9/2014 | Boothby et al. | |
| 2014/0351088 | A1 | 11/2014 | Saxena | |
| 2015/0026088 | A1* | 1/2015 | Alber | G06Q 50/265 |
| | | | | 705/325 |

OTHER PUBLICATIONS

Final Office Action in U.S. Appl. No. 13/797,373, dated Apr. 2, 2015, 23 pages.

Final Office Action in U.S. Appl. No. 13/797,373, dated Jan. 13, 2016, 26 pages.

Herst, J., "New Walk Score Iphone App Unveiled," blog.walkscore.com, Jul. 10, 2012, http://blog.walkscore.com/2012/07/new-walk-score-iphone-app-unveiled/.

Non-Final Office Action in U.S. Appl. No. 13/797,373, dated Aug. 24, 2015, 26 pages.

Non-Final Office Action in U.S. Appl. No. 13/797,373, dated Nov. 21, 2014, 19 pages.

RealtorApp—Realtor App for Iphone, The Best Just Got Better, Jan. 27, 2012, Realtor.com p. 1-2.

TechSavy—Tech Savvy Agent, 3 Real Estate Mobile Apps for Your Clients—House Hunter, GreatSchools and Houzz, techsavvyagent.com, Jan. 30, 2012 p. 1-5.

ZillowApp—Zillow App for Iphone, Description, Jan. 7, 2012, zillow.com, p. 1-4.

Final Office Action in U.S. Appl. No. 13/797,373, dated Apr. 18, 2017, 19 pages.

Non-Final Office Action in U.S. Appl. No. 13/797,373, dated Sep. 20, 2017, 17 pages.

Final Office Action in U.S. Appl. No. 13/797,373, dated Feb. 7, 2018, 18 pages.

\* cited by examiner

Real Estate Listings

| 2355 Mission Street | SF CA |
| 800 sq ft, 1 bd/1 ba | $1,222,000 |

| 2302 Mission Street | SF CA |
| 1500 sq ft, 2 bd/1 ba | $2,500,220 |

| 2414 Mission Street | SF CA |
| 2000 sq ft, 2 bd/2 ba | $10,122,000 |

| 821 Valencia Street | SF CA |
| 500 sq ft, 0 bd/1 ba | $1,422,000 |

| 3504 20th Street | SF CA |
| 700 sq ft, 1 bd/1 ba | $2,100,022 |

| 3219 21st Street | SF CA |
| 2500 sq ft, 2 bd/2 ba | $8,822,000 |

| 225 Lexington Street | SF CA |
| 550 sq ft, 0 bd/1 ba | $6,222,000 |

| 514 Capp Street | SF CA |
| 1200 sq ft, 1 bd/1 ba | $2,200,000 |

NORMALIZATION OF CRIME BASED ON FOOT TRAFFIC

BACKGROUND OF THE INVENTION

A home-seeker looking to buy property may be concerned about the crime level in their area of interest, while at the same time being unfamiliar with the perceived safety of the area from street to street. Crime maps attempt to provide useful information to such a home-seeker, including such information as locations of crimes committed, frequency of crimes committed, types of crimes committed, crimes committed per capita residents, or other appropriate information. For busy urban areas where there is a great deal of foot traffic, such maps may overstate the danger to residents

BRIEF DESCRIPTION OF THE DRAWINGS

Various embodiments of the invention are disclosed in the following detailed description and the accompanying drawings.

FIG. 3 is a diagram illustrating an embodiment of a real estate listings window.

DETAILED DESCRIPTION

Figure 1:
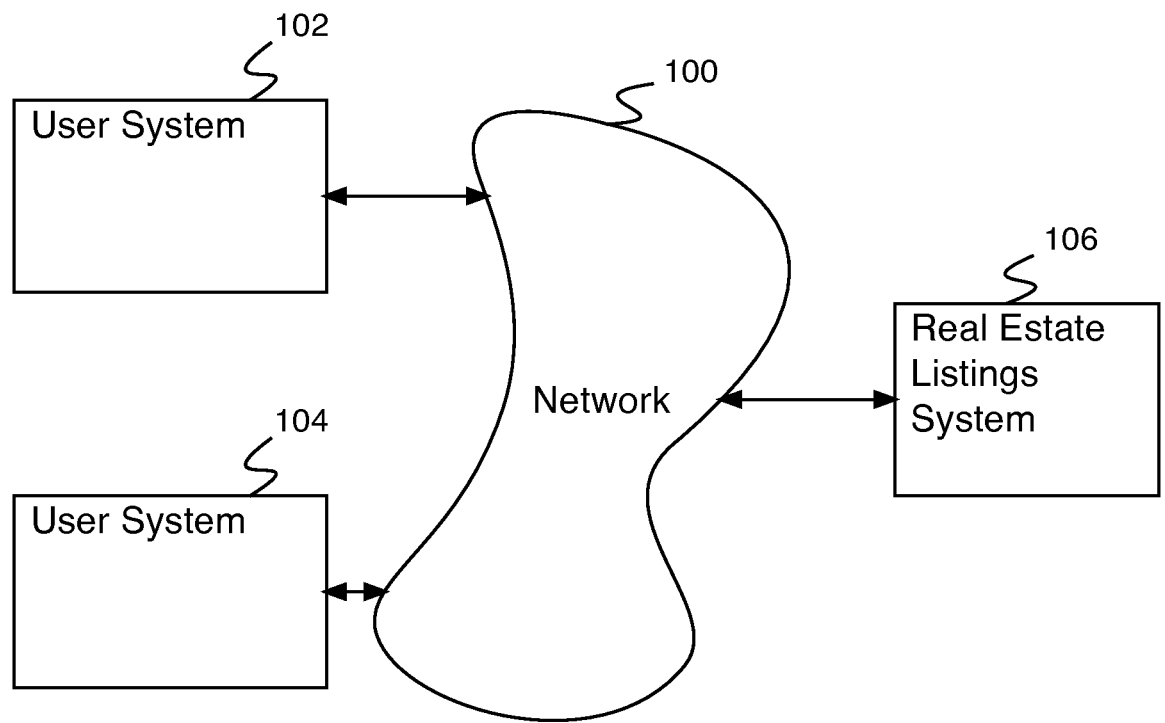
FIG. 1 is a block diagram illustrating an embodiment of a system for normalization of crime based on foot traffic.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Normalization of crime based on foot traffic is disclosed. A system for displaying crime data comprises an input interface configured to receive a crime data and receive a population density data; a processor configured to determine a normalized crime data based at least in part on the crime data and the foot traffic density data; and an output interface configured to provide display information of the normalized crime data. The system for displaying crime data additionally comprises a memory coupled to the processor and configured to provide the processor with instructions.

In some embodiments, rather than displaying crime data normalized by a resident density, a system for normalization of crime based on foot traffic displays crime data normalized to an effective population density describing the number of people in the area at a given time of day (e.g., including car traffic, pedestrians, people at work, homeless people, etc.). In various embodiments, the effective population density is a real-time population density number, is determined using surveyors, cameras, crowdsourcing, mobile telephone technology (e.g., data indicating mobile phone locations), or is determined using any other appropriate means. In various embodiments, the effective population density is described by the population density by street, neighborhood, block, or at any other appropriate level of resolution. For an area that changes a great deal between day and night (e.g., a high density urban area), normalization of crime data to an effective population density gives a more complete picture of the area's character than a naive normalization strategy.

In some embodiments, crime distribution is displayed using a "heat map." For example, a color represents relative crime amounts with "hotter" colors having more crime and "cooler" colors having less crime. Specifically, a score is assigned to a block based upon the relative rate of crime.

In some embodiments, crime is displayed using which quintile the block or area is ranked in. In some embodiments, quintile rankings of crime over highlight low crime areas. In those cases, a score for a block is based upon the crime rate within that block compared to the cumulative of all blocks scores.

In some embodiments, counts of crime are weighted based on crime severity. In various embodiments, a crime is weighted based on perceived severity or a user preference of severity, or any other appropriate weighting. For example, a murder or shooting is weighted higher than a purse snatching for each count of the crimes.

In some embodiments, a crime count is distributed within buffer zones. For example, in some cases a crime is reported with a range of addresses (e.g., a crime is reported as occurring in the 1000-2000 block of a street). The crime count is then added into the regions or areas that are in the vicinity of the range of addresses as the exact location of the crime is not known.

In some embodiments, displaying crime statistics based on geography and creating a heatmap distribution of the crime statistics has problems. For example, raw crime rates are not easily to understand and their complexity is not easily displayed on a map. Also, as another example, variations in police or other agency reporting rate between different areas (e.g., some report only serious crimes, some report every call—for example, including minor offenses like disturbing the peace, traffic stops, etc.), different rates of crime in different areas, make it so that crime rates in one area are not comparable to crime rates in another, and hence, the crime rates are not easily displayed on a map. As another example, due to the geographical distribution of crimes within a area (e.g., of a city), a straightforward linear scaling (crime rate X*ratio Y=score Z) will tend to mark most of the area as either completely unsafe or completely safe. Similarly, much of the differences between scored areas are washed out in a linear scale. So, again the crime rates are not easily displayed on a map in a useful manner to a user.

In various embodiments, the display of crime data (e.g., as shown on a mobile device regarding a neighborhood) is shown using a colored regions overlaid on a map display for the neighborhood, or by neighborhood for a city, or by area for a county, where the crime data is normalized. In some embodiments, the normalization is by a time dependent density of people. In some embodiments, the time dependent density of people includes the time dependent foot traffic. In some embodiments, the time dependent density of people includes the time dependent people employed or resident in the area. In some embodiments, determining the time dependent foot traffic comprises calculating based on a sampled measurement (e.g., scaling based on a sample of actual density). In some embodiments, the foot traffic calculation is based at least in part on mobile phone data that indicates number of mobile phones walking in the area at the time.

In some embodiments, heat maps are displayed by displaying a score related to the crime rate, for example, using colors related to the score:

1. Two geographies are defined—the comparison area and the scoring area. The scoring area is the unit over which crime rates are calculated (e.g., an individual block). The comparison area is the area within which the scored areas are compared (e.g., counties).
2. A calculation of crime rate is chosen. For example, violent crimes are counted over a trailing time period (e.g., 12 months). Police Reports are filtered or weighted based on categories or descriptions. For example, minor offences might be filtered entirely, or given a low weight, and more violent or dangerous incidents are given a higher weight. Where categories fail to separate different reports, textual descriptions can be used.
3. Each scoring area has a crime rate computed for it. This score is based on the intended crime rate query and possibly weighted by category or description. A count is calculated by counting all reports within a small buffer around that geography. Alternative methods have included counting all reports within a geography or counting all reports within a radius of a geography's centroid.
4. The count is then divided by the foot traffic, geographic area, and/or population of the block, with that parameter clamped to a certain minimum, so that an extremely small value for a block does not skew the results.
5. Within a comparison area, the scored areas are ordered by computed crime rate, and a running sum of crime rates is calculated. Scoring areas are given a score based on their ranked running sum. Blocks whose running sum is less than or equal to 20% of the total sum are given a score of '1'. Blocks with a running sum between 20% and 40% are given a score of '2', and so on.

FIG. 1 is a block diagram illustrating an embodiment of a system for normalization of crime based on foot traffic. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102 and user system 104 comprise computing systems for operation by users (e.g., desktop computers, laptop computers, tablet computers, smartphones, etc.). In some embodiments, one or more of user system 102 and user system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). User system 102 and user system 104 comprise systems accessing real estate listings system 106 (e.g., accessing real estate listings system 106 via network 100). In various embodiments, there are 2, 5, 22, 122, 4320, 26100, 136500, or any other appropriate number of user systems accessing real estate listings system 106. Real estate listings system 106 comprises a system for providing real estate listings. In some embodiments, real estate listings system 106 comprises a system for providing a real estate listings website. In some embodiments, real estate listings system 106 comprises a system for providing real estate listing recommendations. In some embodiments, real estate listings system 106 comprises a system for providing crime data. In some embodiments, real estate listings system 106 comprises a system for normalization of crime data based on foot traffic. In various embodiments, real estate listings system 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising user system 102, user system 104, and real estate listings system 106 comprise any one of a variety of proprietary or commercially available single or multi-processor systems (e.g., an Intel™-based processor) or other type of commercially available processor able to support communications in accordance with each particular embodiment and application.

Figure 2:
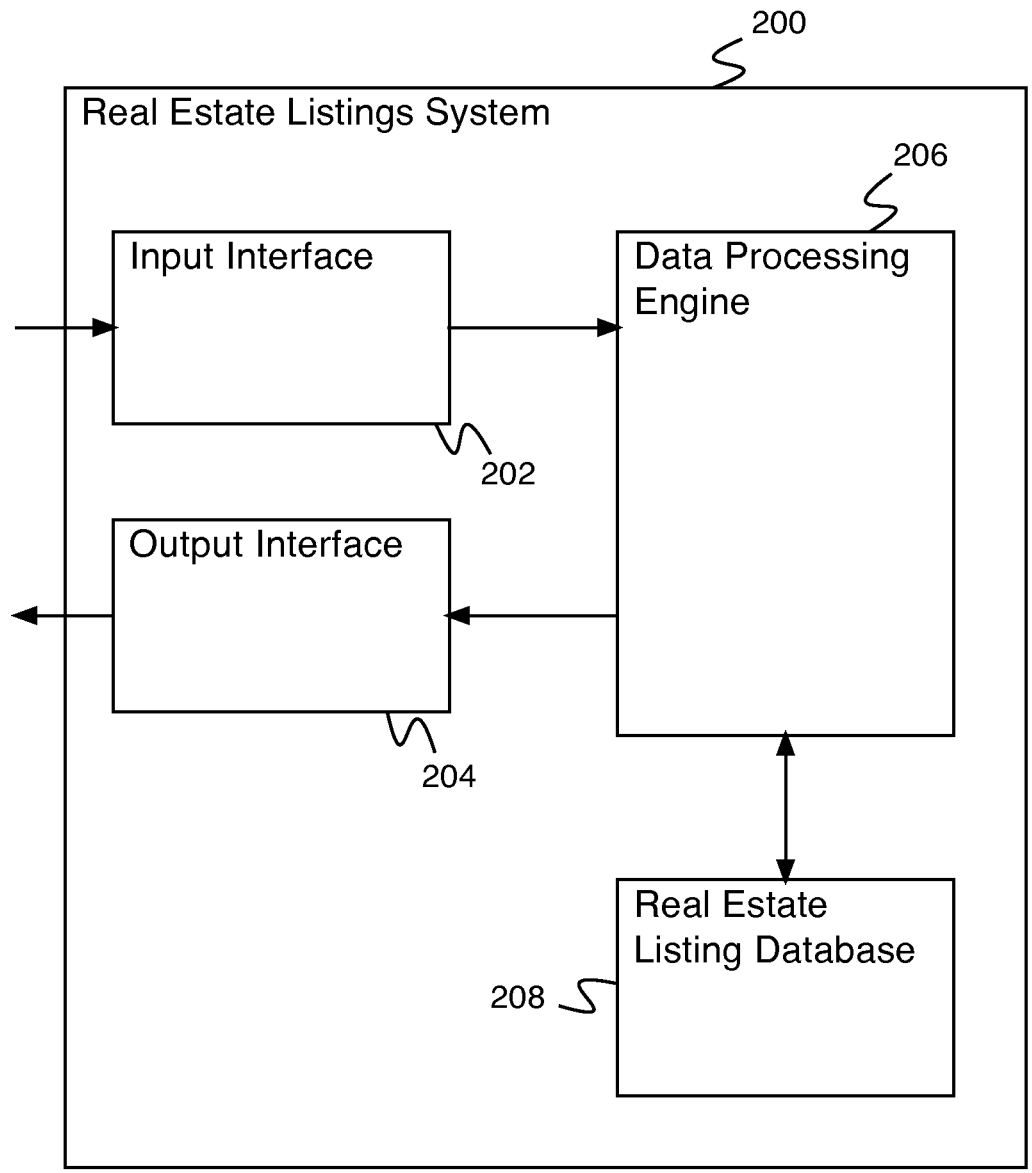
FIG. 2 is a block diagram illustrating an embodiment of a real estate listings system.

FIG. 2 is a block diagram illustrating an embodiment of a real estate listings system. In some embodiments, real estate listings system 200 comprises real estate listings system 106 of FIG. 1. In the example shown, real estate listings system 200 comprises input interface 202, output interface 204, data processing engine 206, and real estate listing database 208. Input interface 202 comprises an interface for receiving data. In some embodiments, input interface 202 comprises an input interface for a user interface. In various embodiments, input interface 202 comprises an input interface for receiving user interface data, real estate data, crime data, resident density data, pedestrian density data, non-resident density data, foot traffic data (e.g., based on cell phone data), sidewalk camera data, sidewalk frequency counter data, crowdsourcing data, map data, or any other appropriate data. Output interface 204 comprises an output interface for sending data. In some embodiments, output interface 204 comprises an output interface for a user interface. In various embodiments, output interface 204 comprises an output interface for sending user interface data, display data, map data, crime data, normalized crime data, or any other appropriate data. Data processing engine 206 comprises a data processing engine for processing data. In some embodiments, data processing engine 206 processes data received from input interface 202 and provides processed data to output interface 204. In some embodiments, data processing engine 206 receives real estate listings from real estate listing database 208. In various embodiments, data processing engine 206 comprises a data processing engine configured to determine an appropriate crime density data, to determine an appropriate population density data, to determine an appropriate normalized crime density data, to provide real estate listings, to provide real estate listing recommendations, or to process data in any other appropriate way.

FIG. 3 is a diagram illustrating an embodiment of a real estate listings window. In some embodiments, real estate listings window 300 of FIG. 3 comprises a real estate listings window used by a real estate listings user (e.g., a real estate listings user using user system 102 of FIG. 1) and provided by a real estate listings system (e.g., real estate listings system 106 of FIG. 1). In the example shown, real estate listings window 300 comprises a set of real estate listings. If a user makes an indication to select a listing in real estate listings window 300 (e.g., a click, a tap, etc.), the user is presented a real estate listing page including more information regarding the real estate listing (e.g., property details, photos, related properties, etc.). In various embodiments, listings in real estate listings window 300 comprise real estate search results, real estate neighborhood listings, real estate recommendations, real estate sponsored listings, real estate listings suggested by another real estate listings user, or any other appropriate real estate listings. A real estate listing on real estate listings window 300 includes information regarding a real estate listing (e.g., a street address, a square footage, a number of bedrooms, a number of bathrooms, an asking price, a picture, etc.).

Figure 4A:
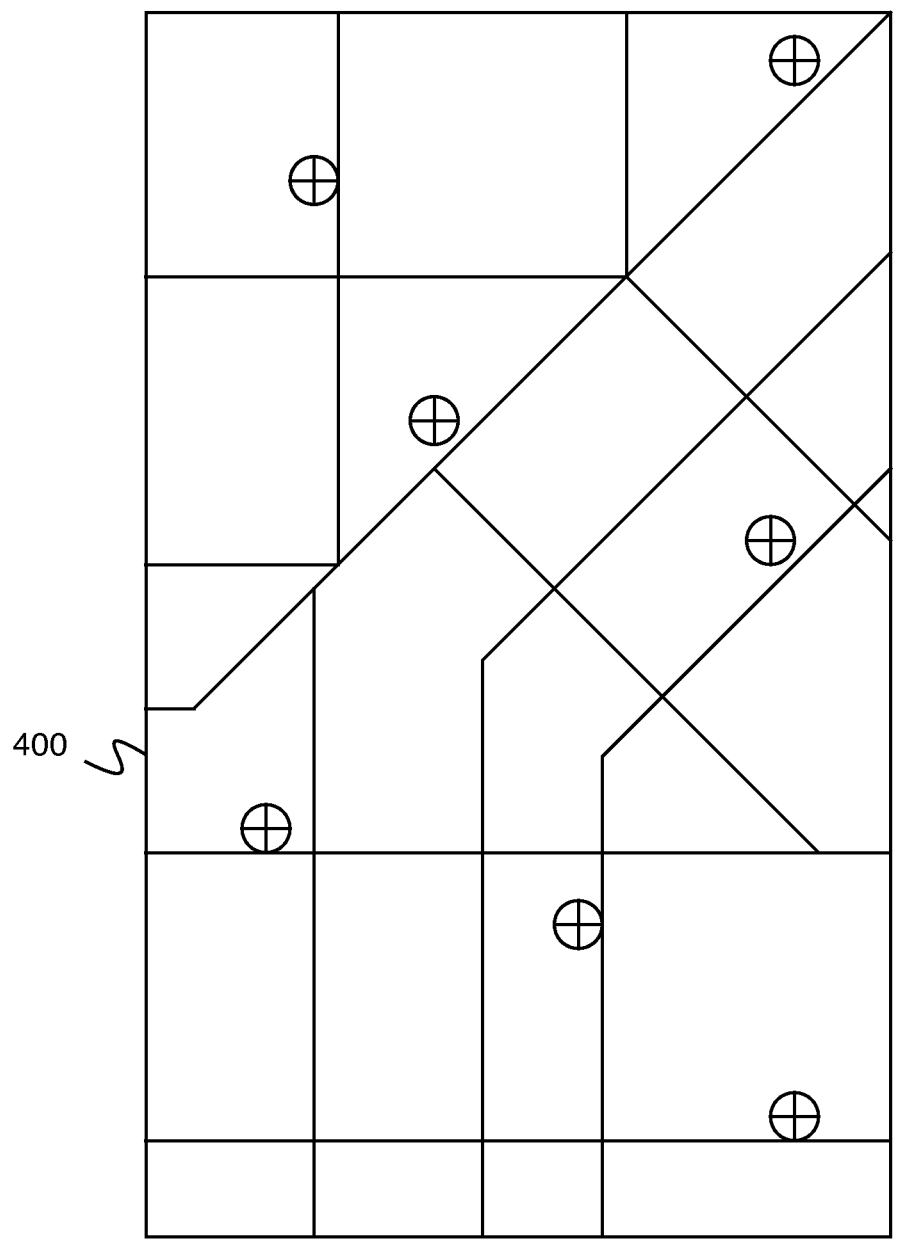
FIG. 4A is a diagram illustrating an embodiment of a real estate listings map.

FIG. 4A is a diagram illustrating an embodiment of a real estate listings map. In some embodiments, real estate listings map 400 comprises a set of real estate listings (e.g., a set of real estate listings as shown in real estate listings window 300 of FIG. 3) shown at their associated locations on a map. In the example shown, the lines on real estate listings map 400 indicate streets and a crosshair symbol is used to indicate a real estate listing. If a user makes an indication to select a listing (e.g., clicking or hovering on the crosshair symbol) in real estate listings map 400 (e.g., a click, a tap, etc.), the user is presented a real estate listing page or pop up including more information regarding the real estate listing (e.g., property details, photos, related properties, etc.).

Figure 4B:
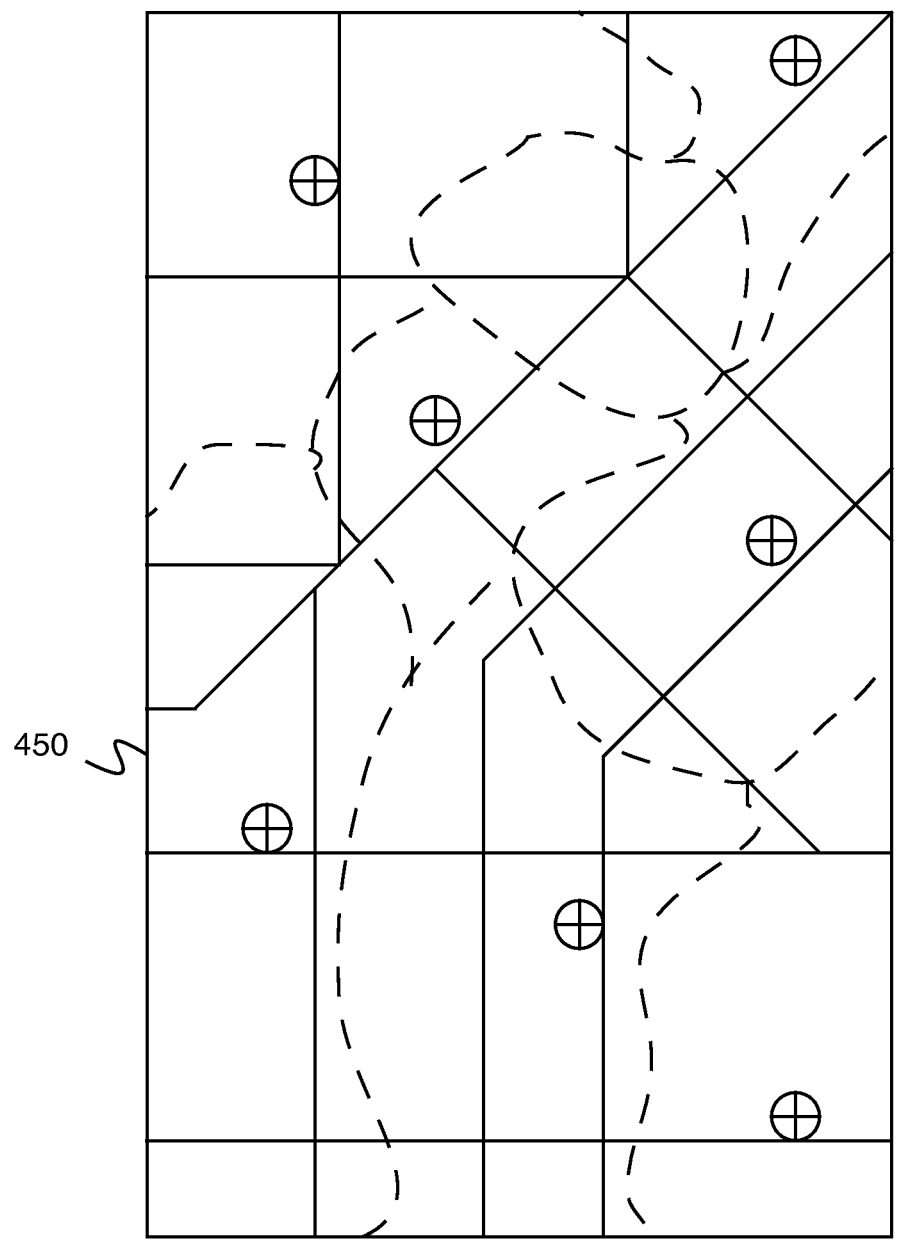
FIG. 4B is a diagram illustrating an embodiment a real estate listings map with crime data overlay.

FIG. 4B is a diagram illustrating an embodiment a real estate listings map with crime data overlay. In the example shown, real estate listings map with crime data overlay 450 comprises a real estate listings map (e.g., a real estate listings map as in real estate listings map 400 of FIG. 4A) with a crime data overlay (e.g., using contour lines, using color, using shading, etc.). In some embodiments, a region drawn in the data overlay comprises a region where the crime data falls within a given range. In some embodiments, a crime data overlay comprises a set of lines dividing regions of differing crime data. In the example shown, solid lines on real estate listings map with crime data overlay 450 indicate streets and dashed lines indicate borders between regions of differing crime data. In various embodiments, crime data range within a region drawn in the data overlay is not indicated, is indicated by a number within the region, is indicated by a shading within the region, is indicated by a coloring within the region, is indicated by the region border color, or is indicated in any other appropriate way.

Figure 5:
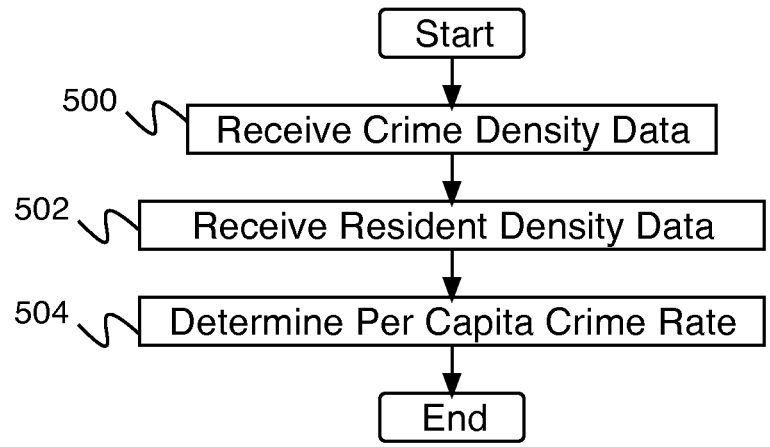
FIG. 5 is a flow diagram illustrating an embodiment of a process for determining a normalized crime rate.

FIG. 5 is a flow diagram illustrating an embodiment of a process for determining a normalized crime rate. In some embodiments, the process of FIG. 5 is used for determining a normalized crime rate from crime density data and population data. In some embodiments, a normalized crime rate comprises a per capita crime rate. In the example shown, in 500, crime density data is received. In various embodiments, crime density data comprises a number of crimes over a given time period for a given street location, block, neighborhood, or any other appropriate area. In some embodiments, crime density data covers multiple areas. In 502, resident density data is received. In various embodiments, resident density data comprises a number of residents for a given street location, block, neighborhood, or any other appropriate area. In some embodiments, resident density data covers multiple areas. In some embodiments, resident density data received in 502 covers the same area or areas as crime density data received in 500. In 504, a per capita crime rate is determined. In some embodiments, the per capita crime rate comprises the quotient of the resident density data received in 502 and the crime density data received in 500. In some embodiments, the per capita crime rate comprises the quotient of the resident density data received in 502 and the crime density data received in 500 for each area covered by the population density data and the crime density data. In some embodiments, the per capita crime rate determined in 504 comprises a resident per capita crime rate. In some embodiments, the process of FIG. 5 is repeated for each map region of a set of map regions. In various embodiments, a map region comprises an address, a street, a block, a neighborhood, or any other appropriate map region.

Figure 6:
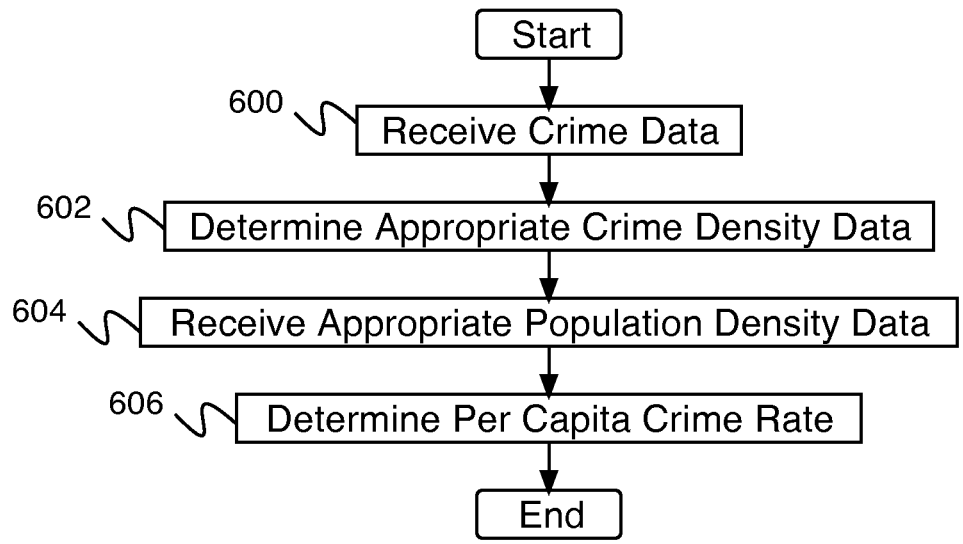
FIG. 6 is a flow diagram illustrating an embodiment of a process for determining a normalized crime rate.

FIG. 6 is a flow diagram illustrating an embodiment of a process for determining a normalized crime rate. In some embodiments, the process of FIG. 6 is used for determining a pedestrian per capita crime rate from crime density data and pedestrian traffic information. In some embodiments, a normalized crime rate comprises a per capita crime rate. In some embodiments, the process of FIG. 6 comprises a process for determining a pedestrian per capita crime rate. In the example shown, in 600, crime data is received. In some embodiments, crime data comprises crime density data. In various embodiments, crime data comprises a number of crimes over a given time period for a given street location, block, neighborhood, or any other appropriate area. In some embodiments, crime data covers multiple areas. In 602, an appropriate crime density data is determined. In various embodiments, an appropriate crime density data comprises violent crime data, non-violent crime data, gang-related crime data, daytime crime data, nighttime crime data, or any other appropriate crime data. In some embodiments, an appropriate crime density data comprises a subset of the crime data received in 600. In some embodiments, the subset of crime data received in 600 comprises appropriate crime density data (e.g., violent crime data, non-violent crime data, gang-related crime data, daytime crime data, nighttime crime data, etc.) is selected by a user (e.g., via a menu, list, radio buttons, etc.). In 604, appropriate population density data is received. In various embodiments, appropriate population density data comprises resident density data, pedestrian density data, non-resident density data, estimated density data, real-time density data, or any other appropriate population density data. In some embodiments, pedestrian density data is determined from pedestrian traffic information. In various embodiments, pedestrian traffic information comprises sidewalk camera data, sidewalk frequency counter data, sidewalk density counter app data, crowdsourcing data, surveyor data, or any other appropriate pedestrian traffic information. In 606, a per capita crime rate is determined. In some embodiments, the per capita crime rate comprises the quotient of the appropriate population density data received in 604 and the appropriate crime density data determined in 602. In some embodiments, the process of FIG. 6 is repeated for each map region of a set of map regions. In various embodiments, a map region comprises an address, a street, a block, a neighborhood, or any other appropriate map region.

Figure 7:
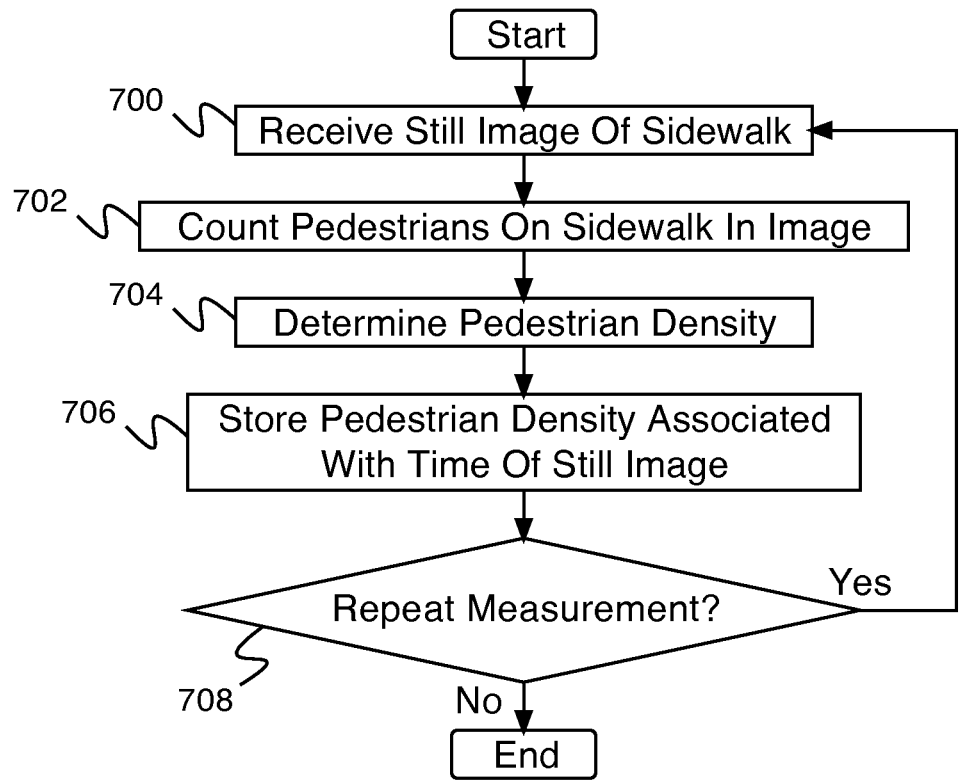
FIG. 7 is a flow diagram illustrating an embodiment of a process for determining a pedestrian density.

FIG. 7 is a flow diagram illustrating an embodiment of a process for determining a pedestrian density. In some embodiments, the process of FIG. 7 is used for determining a set of pedestrian density data from still images. In the example shown, in 700, a still image of a sidewalk is received. In some embodiments, a still image of a sidewalk is received from a sidewalk camera (e.g., a camera facing the sidewalk). In 702, the pedestrians on the sidewalk in the image are counted. In 704, the pedestrian density is determined. In some embodiments, the pedestrian density comprises a number of pedestrians per block. In some embodiments, the pedestrian density is determined by dividing the number of pedestrians counted in 702 by the fraction of the block visible in the still image. In 706, the pedestrian density is stored associated with the time of the still image (e.g., the time the still image was taken). In some embodiments, the pedestrian density is stored associated with the time of the still image in order to distinguish between separate pedestrian density measurements (e.g., between different images). In some embodiments, the pedestrian density is stored associated with the time of the still image in order to build a set of data describing pedestrian density vs. time. In 708, it is determined whether to repeat the measurement. In various embodiments, it is determined not to repeat the measurement if the desired data set is built, if only a single image is desired, if no more measurements are available, or for any other appropriate reason. If it is determined to repeat the measurement, control passes to 700. If it is determined not to repeat the measurement, the process ends. In some embodiments, the process of FIG. 7 is repeated for each map region of a set of map regions. In various embodiments, a map region comprises an address, a street, a block, a neighborhood, or any other appropriate map region.

Figure 8:
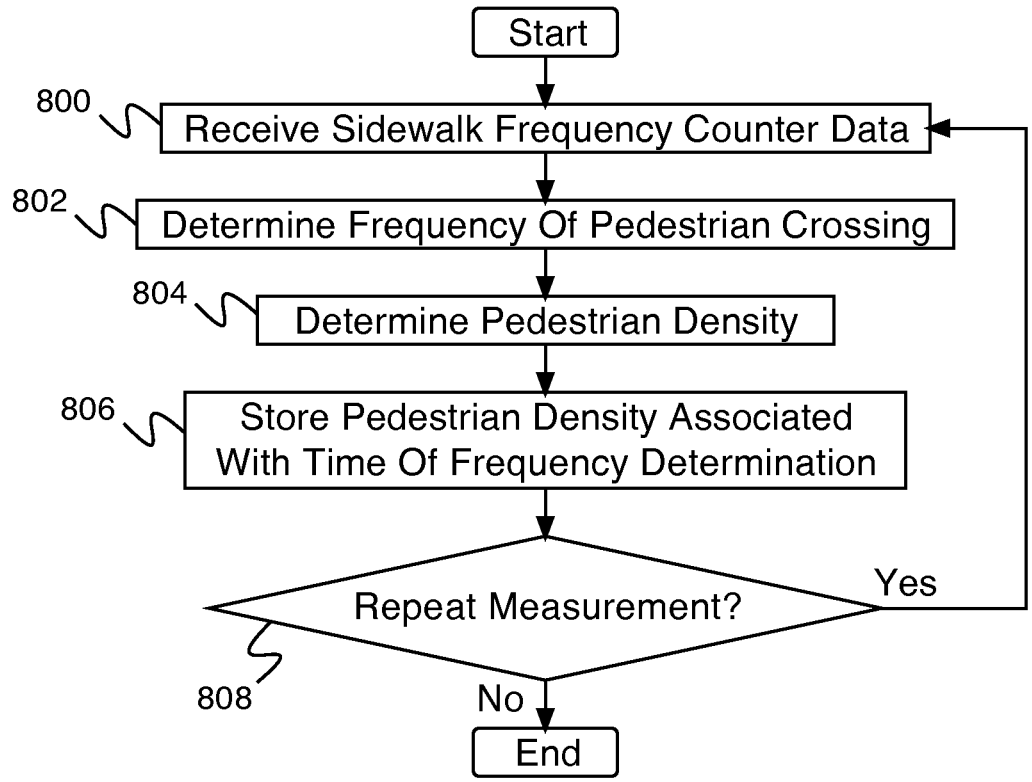
FIG. 8 is a flow diagram illustrating an embodiment of a process for determining a pedestrian density.

FIG. 8 is a flow diagram illustrating an embodiment of a process for determining a pedestrian density. The process of FIG. 8 is used for determining a set of pedestrian density data from a sidewalk frequency counter. In 800, sidewalk frequency counter data is received. In some embodiments, a sidewalk frequency counter comprises a sensor for determining the frequency of pedestrian crossing (e.g., an infrared or laser optical detector, a sidewalk vibration sensor, etc.). In 802, the frequency of pedestrian crossing is determined. In some embodiments, the frequency of pedestrian crossing is determined by counting the number of pedestrian crossings in a given period of time (e.g., the number of pedestrian crossings in the last minute). In 804, pedestrian density is determined. In some embodiments, pedestrian density is determined by multiplying the frequency of pedestrian crossing by the average time to walk a block. In some embodiments, the average time to walk a block is assumed to be 3 minutes (e.g., 5280 feet/20 blocks=264 feet per block, divided by 5280 ft/60 minutes=88 feet/minute average walking speed equals 3 minutes per block). In some embodiments, the determined pedestrian density comprises an estimate. In 806, the pedestrian density is stored associated with the time of the frequency determination. In some embodiments, the pedestrian density is stored associated with the time of the frequency determination in order to distinguish between separate pedestrian density measurements. In some embodiments, the pedestrian density is stored associated with the time of the frequency determination in order to build a set of data describing pedestrian density vs. time. In 808, it is determined whether to repeat the measurement. In various embodiments, it is determined not to repeat the measurement if the desired data set is built, if only a single measurement is desired, if no more data is available, or for any other appropriate reason. In some embodiments, the process of FIG. 8 is repeated continuously to generate real-time pedestrian density data. If it is determined to repeat the measurement, control passes to 800. If it is determined not to repeat the measurement, the process ends. In some embodiments, the process of FIG. 8 is repeated for each map region of a set of map regions. In various embodiments, a map region comprises an address, a street, a block, a neighborhood, or any other appropriate map region.

Figure 9:
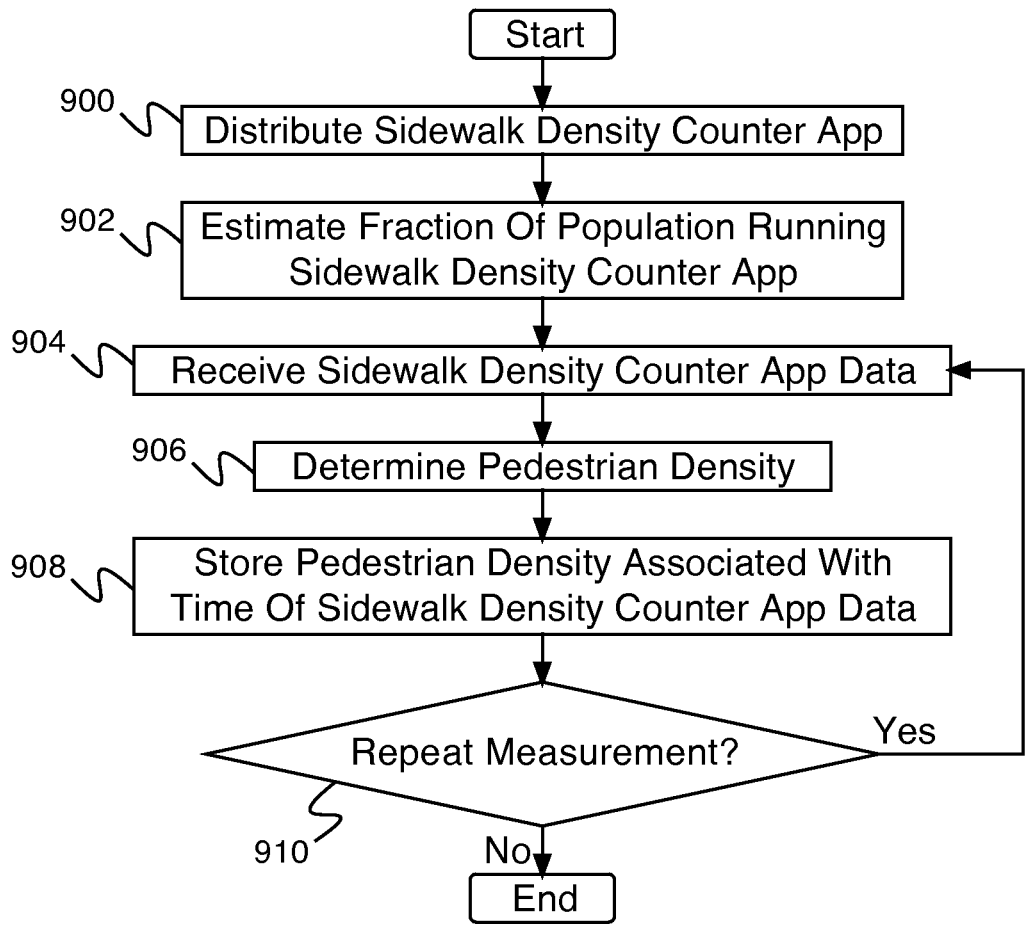
FIG. 9 is a flow diagram illustrating an embodiment of a process for determining a pedestrian density.

FIG. 9 is a flow diagram illustrating an embodiment of a process for determining a pedestrian density. In some embodiments, the process of FIG. 9 is used for determining a set of pedestrian density data from a sidewalk density counter app. In some embodiments, a process for determining a pedestrian density data from a sidewalk density counter app comprises determining a pedestrian density data using crowdsourcing. In some embodiments, a process for determining a pedestrian density data from a sidewalk density counter app comprises determining a pedestrian density data using mobile telephone technology. In 900, a sidewalk density counter app is distributed. In various embodiments, the sidewalk density counter app is distributed via the Internet, via an app store, over flash drives, through email, preinstalled by a hardware manufacturer, or in any other appropriate way. In 902, the fraction of the population running the sidewalk density counter app is estimated. In some embodiments, the fraction of the population running the sidewalk density counter app is estimated by estimating the number of sidewalk density counter app installs multiplied by an estimated attrition rate (e.g., 5% of users per year stop using the app), and dividing by the total population. In some embodiments, data is determined to be accurate only if the fraction of the population in a given area is running the sidewalk density counter app (e.g., only if greater than 2% of a given city is running the app). In 904, sidewalk density counter app data is received. In some embodiments, sidewalk density counter app data comprises a location for each user determined to be on a sidewalk. In some embodiments, sidewalk density counter app data comprises a number of sidewalk density counter app users per block. In some embodiments, sidewalk density counter app data is received for a given period of time (e.g., five seconds, one minute, five minutes, etc.) and averaged over that time period. In some embodiments, the lower a fraction of the total population running the sidewalk density counter app, the more averaging is necessary in order to create meaningful data. In 906, pedestrian density is determined. In some embodiments, pedestrian density is determined by multiplying a number of sidewalk density counter app users by the ratio of the total population to the number of people running the sidewalk density counter app (e.g., by the inverse of the fraction determined in 902). In 908, the pedestrian density is stored associated with the time of the sidewalk density counter app data (e.g., the time the sidewalk density counter data was received). In various embodiments, if the sidewalk density counter app data was averaged over a period of time, the pedestrian density is stored associated with the beginning of the period of time, the middle of the period of time, the end of the period of time, or with any other appropriate time. In some embodiments, the pedestrian density is stored associated with the time of the sidewalk density counter app data in order to distinguish between separate pedestrian density measurements. In some embodiments, the pedestrian density is stored associated with the time of the sidewalk density counter app data in order to build a set of data describing pedestrian density vs. time. In 910, it is determined whether to repeat the measurement. In various embodiments, it is determined not to repeat the measurement if the desired data set is built, if only a single measurement is desired, if no more data is available, or for any other appropriate reason. If it is determined to repeat the measurement, control passes to 904. If it is determined not to repeat the measurement, the process ends. In some embodiments, the process of FIG. 9 is repeated for each map region of a set of map regions. In various embodiments, a map region comprises an address, a street, a block, a neighborhood, or any other appropriate map region.

Figure 10:
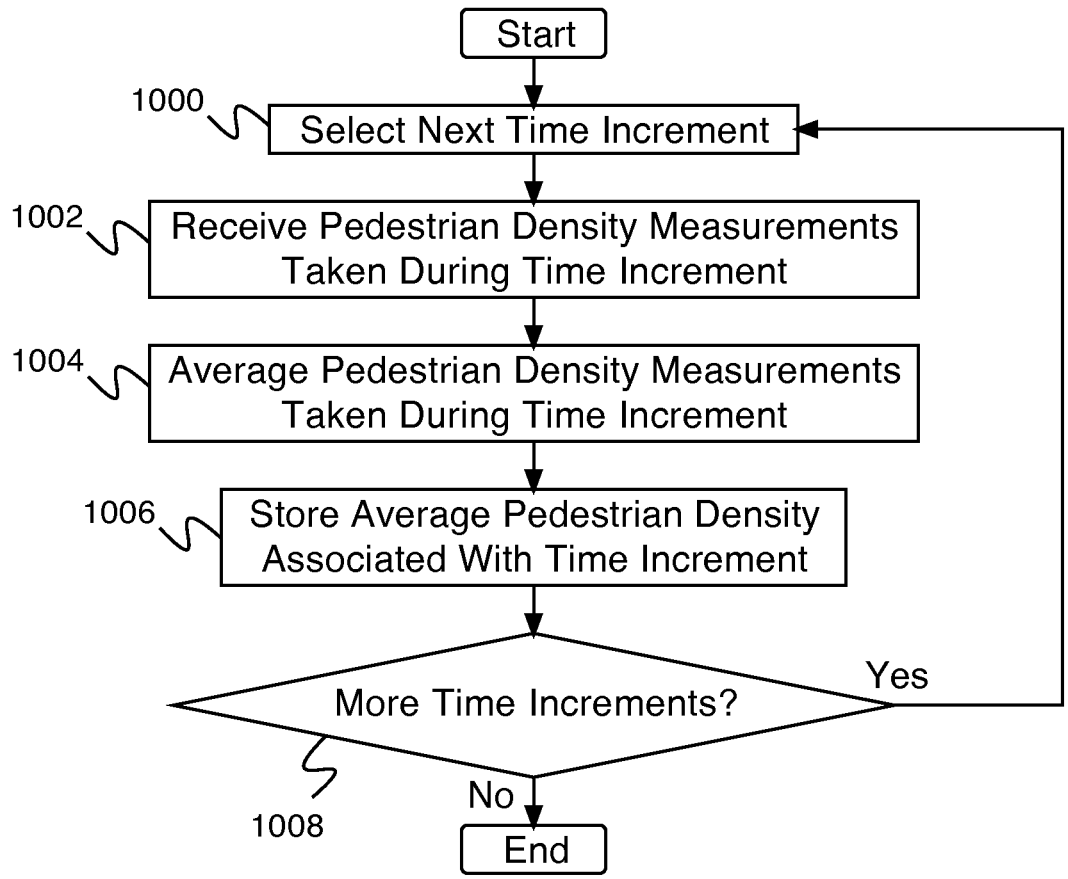
FIG. 10 is a flow diagram illustrating an embodiment of a process for creating a mapping between pedestrian density and time.

FIG. 10 is a flow diagram illustrating an embodiment of a process for creating a mapping between pedestrian density and time. In some embodiments, the process of FIG. 10 is used to process a set of a large number of pedestrian density measurements stored associated with times (e.g., pedestrian density measurements computed in the processes of FIG. 7, FIG. 8, or FIG. 9) into a mapping from time to pedestrian density. In the example shown, in 1000, the next time increment is selected. In some embodiments, the next time increment comprises the first time increment (e.g., the time increment beginning at 12:00 midnight). In various embodiments, time increments are five minutes, fifteen minutes, one hour, or any other appropriate length. In 1002, pedestrian density measurements taken during the time increment are received. In some embodiments, pedestrian density measurements taken during the time increment were taken on different days. In 1004, the pedestrian density measurements taken during the time increment are averaged (e.g., one density measurement is created from whatever number of density measurements were initially recorded). In 1006, the average pedestrian density is stored associated with the time increment. In 1008, it is determined whether there are more time increments. If there are more time increments, control passes to 1000. If there are not more time increments, the process ends. In some embodiments, the process of FIG. 10 is repeated for each map region of a set of map regions. In various embodiments, a map region comprises an address, a street, a block, a neighborhood, or any other appropriate map region.

In some embodiments, stored pedestrian density is used to calculate actual density. For example, the stored pedestrian density is the mobile or cell phone density for a given carrier (e.g., as measured using global positioning data, cell tower data, etc.) or for all carriers. In some embodiments, the stored pedestrian density is scaled to estimate foot pedestrian data based on the proportion estimate of the pedestrian population for a given carrier or not scaled for data of all carriers or scaled for the proportion estimate of the pedestrian population of cell phone customers to all people walking on the street.

Figure 11:
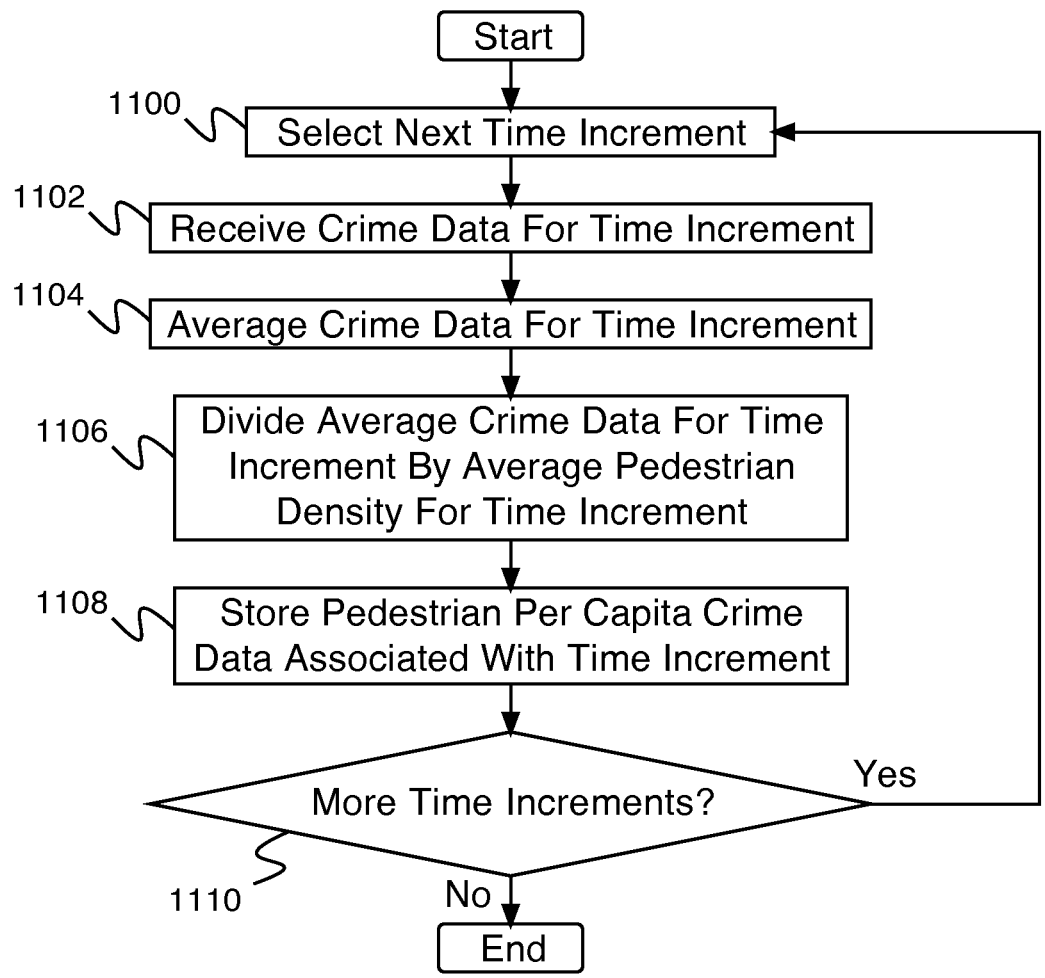
FIG. 11 is a flow diagram illustrating an embodiment of a process for creating a mapping between pedestrian per capita crime data and time.

FIG. 11 is a flow diagram illustrating an embodiment of a process for creating a mapping between pedestrian per capita crime data and time. In some embodiments, the process of FIG. 11 is used to process a set of a large number of crime incidents and times and a mapping from time to pedestrian density into a mapping from time to pedestrian per capita crime data. In the example show, in 1100, the next time increment is selected. In some embodiments, the next time increment comprises the first time increment (e.g., the time increment beginning at 12:00 midnight). In various embodiments, time increments are five minutes, fifteen minutes, one hour, or any other appropriate length. In 1102, crime data is received for the time increment. In some embodiments, crime data for the time increment comprises a set of crimes that occurred during the time increment. In some embodiments, crimes that occurred during the time increment occurred on different days. In some embodiments, crime data for the time increment comprises a number of crimes that occurred during the time increment on a number of different days. In 1104, crime data for the time increment is averaged. In some embodiments, averaging crime data for the time increment comprises determining an average number of crimes during the time increment per day. In 1106, the average crime data for the time increment is divided by the average pedestrian density for the time increment (e.g., the average pedestrian density for the time increment calculated in FIG. 10). In 1108, the pedestrian per capita crime data is stored associated with the time increment. In 1110, it is determined whether there are more time increments. If it is determined that there are more time increments, control passes to 1100. If it is determined that there are not more time increments, the process ends. In some embodiments, the process of FIG. 11 is repeated for each map region of a set of map regions. In various embodiments, a map region comprises an address, a street, a block, a neighborhood, or any other appropriate map region.

Figure 12:
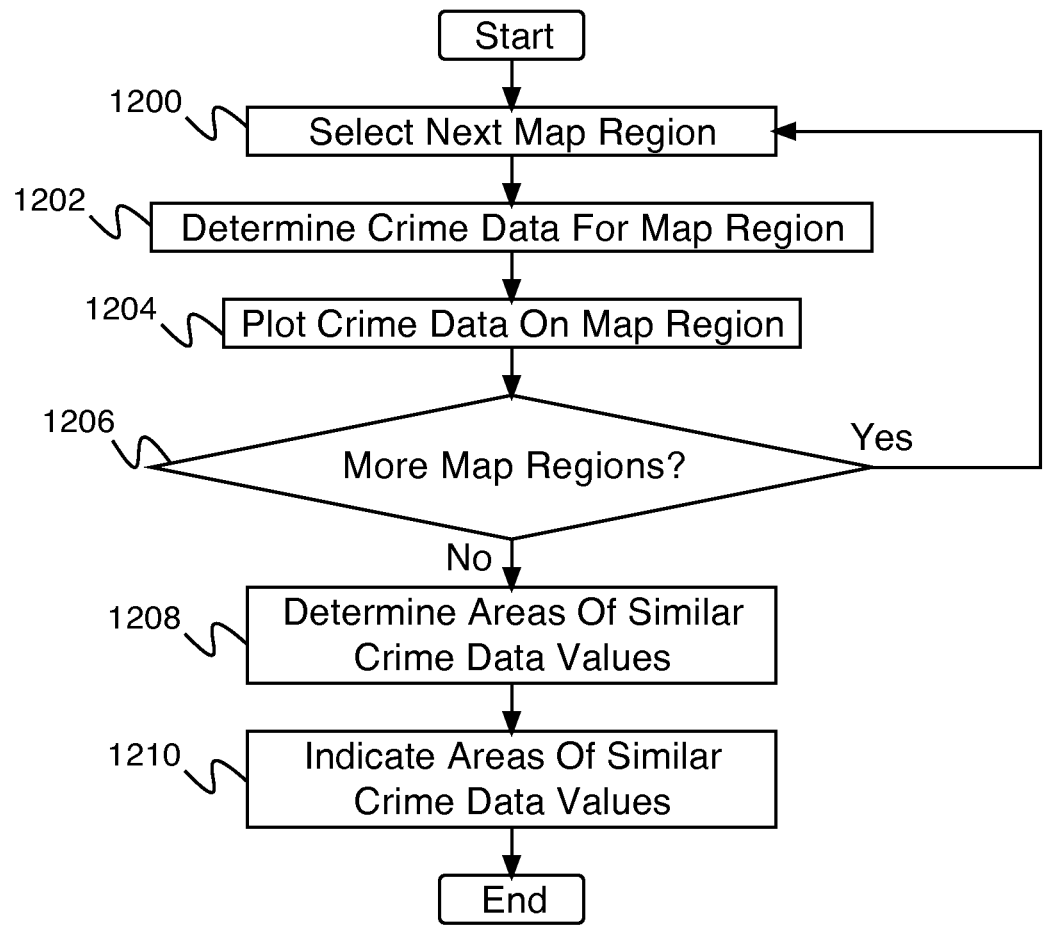
FIG. 12 is a flow diagram illustrating an embodiment of a process for making a crime map overlay.

FIG. 12 is a flow diagram illustrating an embodiment of a process for making a crime map overlay. In some embodiments, the process of FIG. 12 is used to take a set of crime data and create a set of map regions indicating areas of similar crime data values. In some embodiments, the process of FIG. 12 comprises providing display information of normalized crime data. In some embodiments, display information of the normalized crime data comprises map data. In the example shown, in 1200, the next map region is selected. In some embodiments, the next map region comprises the first map region. In various embodiments, a map region comprises an address, a street, a block, a neighborhood, or any other appropriate map region. In 1202, crime data for the map region is determined. In various embodiments, crime data comprises raw crime data (e.g., from a database of crime data), averaged crime data, normalized crime data, resident per capita crime data, pedestrian per capita crime data, crime data at a given time, crime data by time of day, crime data updated in real time, or any other appropriate crime data. In 1204, the crime data is plotted on the map region. In 1206, it is determined whether there are more map regions. If it is determined that there are more map regions, control passes to 1200. If it is determined that there are not more map regions, control passes to 1208. In 1208, areas of similar crime data values are determined. In some embodiments, crime data value ranges are predetermined (e.g., 1-2 crimes/day, 3-4 crimes/day, etc.) and areas of similar crime data values comprise adjoining sets of map regions with crime data values all within a given crime data value range. In 1210, areas of similar crime data values are indicated. In various embodiments, areas of similar crime data values are indicated by a number within the area, by a shading within the area, by a coloring within the area, by the area border color, or in any other appropriate way.

In some embodiments, a user's browser requests one or multiple parts of a map region. Then for each region, crime data is determined, and the crime data is plotted.

Figure 13:
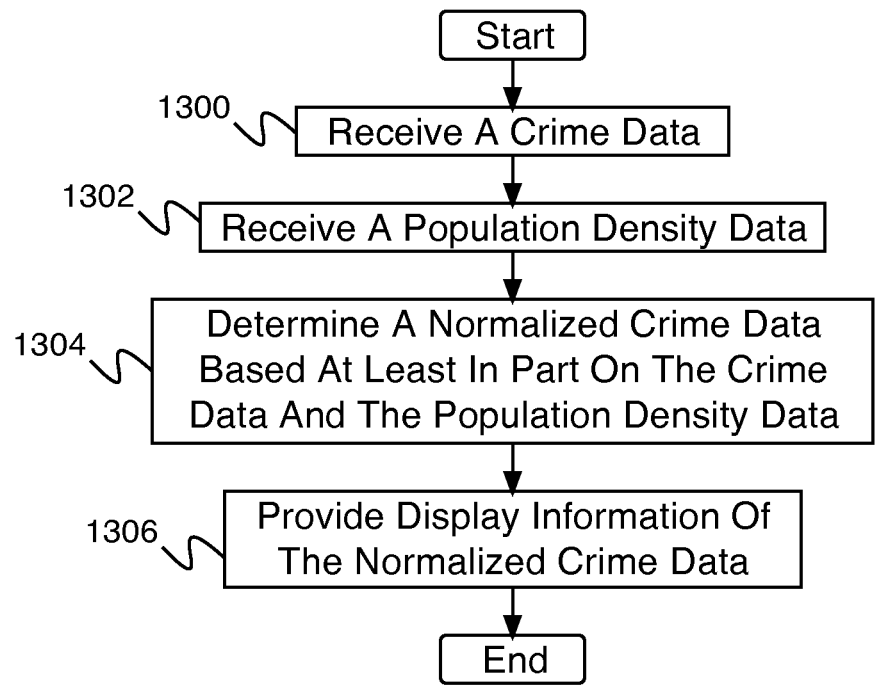
FIG. 13 is a flow diagram illustrating an embodiment of a process for normalization of crime based on foot traffic.

FIG. 13 is a flow diagram illustrating an embodiment of a process for normalization of crime based on foot traffic. In some embodiments, the process of FIG. 13 is used to compute and display a pedestrian per capita crime data. In the example shown, in 1300, a crime data is received. In 1302, a population density data is received. For example, a foot traffic density data is received. In some embodiments, the foot traffic density data is based at least in part on cell phone data. For example, a cell phone carrier data indicates that the number of cell phones providing global positioning signal data indicating that the cell phones are at particular locations, and these data are used to extrapolate the foot traffic (e.g., scaled by the percentage market share the cell phone carrier has). In 1304, a normalized crime data is determined based at least in part on the crime data and the population density data. In 1306, display information of the normalized crime data is provided.

In various embodiments, the display information includes foot traffic density data as a function of time of day, hour of the day, day of the week, day of the year, month of the year, week of the year, or any other appropriate foot traffic density data. In some embodiments, the display of information is displayed using a heat map (e.g., using colors overlapping a map to indicate crime data amount/rate as a function of location). In some embodiments, the binary designation is indicated as to whether an area on a map is safe or not safe (e.g., based on the crime data or normalized crime data being higher or lower than a predetermined threshold).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying crime data, comprising:
an input interface that:
receives crime data for a comparison area, the comparison area comprising a plurality of scoring areas,
receives, from a first user, a user preference of severity of a first crime,
receives, from the first user, a user preference of severity of a second crime, and
receives real-time foot traffic density data for each scoring area of the comparison area;
a memory;
a processor, coupled to the memory, that:
for each crime represented in the crime data, assigns a weight to the crime, wherein a first weight assigned to the first crime is different from a second weight assigned to the second crime,
for each scoring area,
generates a weighted crime count for the scoring area based on the first weight assigned to the first crime, a count of the first crime, the second weight assigned to the second crime, and a count of the second crime, wherein the first weight is based on the received user preference of severity of the first crime, and wherein the second weight is based on the received user preference of severity of the second crime, and
normalizes the crime data for the scoring area based on the generated weighted crime count for the scoring area and the real-time foot traffic density data for the scoring area,
provides display information of the normalized crime data,
determines that the real-time foot traffic density data for the region is below a minimum value, and
in response to determining that the real-time foot traffic density data for the comparison area is below the minimum value,
collects additional real-time foot traffic density data for the comparison area, and
normalizes the crime data for the comparison area based on the additional real-time foot traffic density data; and
an output interface that displays information of at least one real estate listing recommendation based on the normalized crime data.

2. The system of claim 1, wherein the crime data comprises violent crime data.

3. The system of claim 1, wherein the crime data comprises non-violent crime data.

4. The system of claim 1, wherein the crime data comprises gang-related crime data.

5. The system of claim 1, wherein the crime data comprises daytime crime data.

6. The system of claim 1, wherein the crime data comprises nighttime crime data.

7. The system of claim 1, wherein the normalized crime data is based on resident density data.

8. The system of claim 1, wherein the normalized crime data is based on non-resident density data.

9. The system of claim 1, wherein the normalized crime data is based on real-time density data.

10. The system of claim 1, wherein the normalized crime data is based on estimated density data.

11. The system of claim 1, wherein the normalized crime data is based on density data determined using one or more sidewalk cameras.

12. The system of claim 1, wherein the normalized crime data is based on density data determined using crowdsourcing.

13. The system of claim 1, wherein the normalized crime data is based on density data determined using mobile telephone technology.

14. The system of claim 1, wherein the normalized crime data is based on density data determined using surveyors.

15. The system of claim 1, wherein the normalized crime data comprises the quotient of the crime data divided by the foot traffic density data.

16. The system of claim 1, wherein the displayed information of the normalized crime data comprises map data.

17. The system of claim 1, wherein of the normalized crime data comprises crime data by street.

18. The system of claim 1, wherein the normalized crime data comprises crime data by block.

19. The system of claim 1, wherein the normalized crime data comprises crime data by neighborhood.

20. The system of claim 1, wherein the normalized crime data comprises crime data by time of day.

21. The system of claim 1, wherein the normalized crime data comprises information updated in real time.

22. A method for displaying crime data, comprising:
receiving crime data for a region;
receiving foot traffic density data for the region;
receiving, from a first user, a user preference of severity of a first crime;
receiving, from the first user, a user preference of severity of a second crime;
for each crime represented in the crime data,
assigning a weight to the crime, wherein a first weight assigned to the first crime is different from a second weight assigned to the second crime;
generate a weighted crime count based on the first weight assigned to the first crime, a count of the first crime, the second weight assigned to the second crime, and a count of the second crime, wherein the first weight is based on the received user preference of severity of the first crime, and wherein the second weight is based on the received user preference of severity of the second crime;
normalizing, using a processor, the crime data for the region based on the foot traffic density;
providing display information of the normalized crime data,
causing an output interface to display a real estate listing map with an overlay comprising
at least a portion of the normalized crime data, wherein the overlay comprises an area where the normalized crime data is within a range of values;
determining that the foot traffic density data for the region is below a minimum value;
in response to determining that the real-time foot traffic density data for the region is below the minimum value,
collecting additional real-time foot traffic density data for the region, and
normalizing the crime data for the region based on the additional real-time foot traffic density data.

23. A non-transitory computer readable medium storing instructions that, when executed by a processor, cause the processor to perform a method for displaying crime data, the method comprising:
receiving crime data for a region;
receiving real-time foot traffic density data for the region;
receiving, from a first user, a user preference of severity of a first crime;
receiving, from the first user, a user preference of severity of a second crime;
for each crime represented in the crime data, assigning a weight to the crime, wherein a first weight assigned to the first crime is different from a second weight assigned to the second crime, wherein the first weight is based on the received user preference of severity of the first crime, and wherein the second weight is based on the received user preference of severity of the second crime;

normalizing the crime data for the region based on the real-time foot traffic density data;
causing an output interface to display information of at least one real estate listing recommendation based on the normalized crime data;
providing display information of the normalized crime data;
determining that the real-time foot traffic density data for the region is below a minimum value; and
in response to determining that the real-time foot traffic density data for the region is below the minimum value,
collecting additional real-time foot traffic density data for the region, and
normalizing the crime data for the region based on the additional real-time foot traffic density data.

24. The system of claim 1, wherein the weight assigned to a crime is based on the severity of the crime.

25. The system of claim 11, wherein the processor further:
for each of one or more images captured by the one or more sidewalk cameras, counts a number of pedestrians within the image,
determines density data based on the counted number of pedestrians and a fraction of a block visible in the image, and
stores the determined density data in association with a time at which the image was captured.

26. The system of claim 1, wherein the processor further:
orders each of the scoring areas within the comparison area by crime rate; and
assigns a score to each of the scoring areas based on its crime rate relative to the crime rates of other scoring areas within the comparison area, wherein the assigned scores are different from the crime rates.

27. The computer readable medium of claim 23, wherein the normalizing based on the real-time foot traffic density for the scoring area comprises determining whether the real-time foot traffic density data for the scoring area is below the minimum value, and if so, setting the real-time foot traffic density data for the scoring area to the minimum value.

28. The system of claim 1, further comprising:
a sidewalk density counter app that provides pedestrian density information.

29. The method of claim 22, further comprising:
identifying, from among a plurality of scoring areas, scoring areas having similar crime data values.

30. The method of claim 29, wherein scoring areas of similar crime data values comprise adjoining sets of regions with crime data values all within a given crime data value range.

31. The method of claim 29, further comprising:
indicating the identified areas of similar crime data values, wherein the indicating comprises displaying a number within the areas of similar crime data values or by displaying an area border of a particular color around the areas of similar crime data values.

* * * * *